United States Patent
Pratt, Jr. et al.

(10) Patent No.: US 12,294,617 B2
(45) Date of Patent: May 6, 2025

(54) SECURITY NEGOTIATIONS BETWEEN DIFFERENT VERSIONED PROTOCOL DEVICES TO ENABLE BACKWARD COMPATIBILITY

(71) Applicant: FIELDCOMM GROUP, INC., Austin, TX (US)

(72) Inventors: Wallace A. Pratt, Jr., Pflugerville, TX (US); Mark J. Nixon, Thorndale, TX (US); Aaron C. Jones, Austin, TX (US)

(73) Assignee: FIELDCOMM GROUP, INC., Austin, TX (US)

( * ) Notice: Subject to any disclaimer, the term of this patent is extended or adjusted under 35 U.S.C. 154(b) by 247 days.

(21) Appl. No.: 17/887,196

(22) Filed: Aug. 12, 2022

(65) Prior Publication Data

US 2023/0051133 A1 Feb. 16, 2023

Related U.S. Application Data

(60) Provisional application No. 63/233,154, filed on Aug. 13, 2021.

(51) Int. Cl.
H04L 9/40 (2022.01)

(52) U.S. Cl.
CPC .................................. H04L 63/205 (2013.01)

(58) Field of Classification Search
None
See application file for complete search history.

(56) References Cited

U.S. PATENT DOCUMENTS 6,353,620 B1 * 3/2002 Sallberg ................ H04W 28/16
370/465
2005/0155040 A1 7/2005 Doshi et al.
(Continued)

OTHER PUBLICATIONS

International Search Report and Written Opinion for Application No. PCT/US2022/040222, dated Dec. 8, 2022.
(Continued)

Primary Examiner — Joshua Joo
(74) Attorney, Agent, or Firm — MARSHALL, GERSTEIN & BORUN LLP (57) ABSTRACT

A system and method of performing communications over a communications network that uses a communication protocol having multiple different versions, provides for backwards compatibility when devices that support a higher or more secure version of the communication protocol are added to a network having devices that only support a lower or less secure version of the communication protocol. The system and method includes a technique of negotiating and establishing security procedures to be implemented in a communication connection between two devices on the network based on initial session request messages that indicate the version of the communication protocol supported by one or both of the devices. This system and method enable higher and lower protocol version devices (i.e., devices that conform to or that use the same communication protocol but that have different versions of the protocol installed therein) to communicate with one another in the most secure manner, thereby making higher version devices added to a network backward compatible with lower version devices already within the network.

31 Claims, 2 Drawing Sheets

(56) References Cited

U.S. PATENT DOCUMENTS

| | | | |
|---|---|---|---|
| 2006/0282545 A1* | 12/2006 | Arwe | G06F 8/71 |
| | | | 709/237 |
| 2007/0195755 A1 | 8/2007 | Li et al. | |
| 2008/0056494 A1* | 3/2008 | Jacobson | H04L 63/166 |
| | | | 380/255 |
| 2008/0250146 A1* | 10/2008 | Arwe | H04L 69/24 |
| | | | 709/227 |
| 2008/0253391 A1 | 10/2008 | Krits et al. | |
| 2009/0083430 A1 | 3/2009 | Edge et al. | |
| 2009/0307752 A1* | 12/2009 | Ohashi | H04L 63/08 |
| | | | 726/3 |
| 2015/0101028 A1* | 4/2015 | Kruse | H04L 63/08 |
| | | | 726/4 |
| 2015/0381656 A1* | 12/2015 | Kelson | H04L 63/0435 |
| | | | 713/153 |
| 2017/0331929 A1 | 11/2017 | Zielinski et al. | |
| 2018/0103161 A1* | 4/2018 | Yamauchi | G06F 21/602 |
| 2018/0241730 A1* | 8/2018 | Clere | H04L 63/123 |
| 2019/0372784 A1* | 12/2019 | Schexnaydre | H04L 63/0823 |
| 2021/0318863 A1* | 10/2021 | Martin | H04L 41/0895 |
| 2024/0089326 A1* | 3/2024 | Nixon | G05B 19/058 |

OTHER PUBLICATIONS

Communication pursuant to Rules 161(2) and 162 EPC which issued in European Patent Application No. 22856677.4 dated Mar. 20, 2024.

* cited by examiner

SECURITY NEGOTIATIONS BETWEEN DIFFERENT VERSIONED PROTOCOL DEVICES TO ENABLE BACKWARD COMPATIBILITY

RELATED APPLICATIONS

This is a regular-filed application which is based on and claims priority to U.S. Provisional Patent Application Ser. No. 63/233,154, entitled "Security Negotiations Between Different Versioned Protocol Devices to Enable Backward Compatibility," which was filed on Aug. 13, 2021, the entire disclosure of which is hereby expressly incorporated by reference herein.

FIELD OF TECHNOLOGY

The present invention relates generally to communication networks and, more particularly, to secure operations in communication networks that implement different security requirements for different versions of a communication protocol.

BACKGROUND

It is known to use standardized communication protocols in the process control industry to enable devices made by different manufacturers to communicate with one another in an easy to use and easy to implement manner. Over time a significant number of such standardized communication protocols have been developed using vastly different types of technology, including using wired and wireless technology. In particular, there are a number of well-known hard-wired based communication protocols, i.e., protocols developed for use over dedicated hard-wired communication lines. One such well known communication standard used in the process control industry is the Highway Addressable Remote Transmitter (HART) protocol, referred to generally as the HART protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. The HART protocol generally requires the use of dedicated, hardwired communication lines, resulting in significant wiring needs within a process plant. However, other wired protocols include, for example, the Profibus protocol, the Foundation Fieldbus protocol, etc.

Still further, other process control communication protocols have been developed to use wireless communications to perform process control communications and functions in a wireless manner. In particular, wireless communication protocols have been developed to provide wireless communications between field devices and process controllers (as well as other devices) in the process control industry. The WirelessHART protocol is an example of one such wireless protocol.

However, more recently, there has been a move in the process control industry to leverage well-known internet protocol (IP) communication networks to perform process control functions. In the past, various parts of a plant or process control network used more standardized IP networks, such as an Ethernet communication bus, to relay messages between various process control devices, such a process controllers, and user interfaces, servers, databases, etc. in the back end of a plant. In these cases, process control data was generally developed and communicated between process controllers and various field devices in the plant using one or more specialized process control industry communication protocols, such as HART, Foundation Fieldbus, WirelessHART, etc., and was converted at a gateway device, such as a process controller, to standardized packets (e.g., IP packets) to be sent to user interfaces, databases, etc. within the plant over a standard IP based network such as an Ethernet network using a standard IP communication protocol. However, to make communications in a plant more seamless, the HART-IP protocol has been developed to enable HART protocol (as well as WirelessHART protocol) messages to be directly tunneled within a set of IP packets to be sent over an IP communication network using IP based communications.

However, in all of these protocols and methodologies, the process control industry requires that the communication protocol servicing a particular process control network be able to protect the network from unauthorized access. Whether malicious or accidental, intrusion into a process control network may create a safety risk for plant personnel, damage the equipment, or result in a loss of production capability. Moreover, it is often desirable to protect the information exchanged in a process control network from unauthorized reading or copying even when this form of intrusion has no impact on network operation. For example, information exchanged by network devices in some industries may reflect a level of production which may be valuable economic data of a proprietary nature. In order to provide this security, various different protocols implement security measures, such as encryption, security key exchange, etc. to establish and implement secured messaging.

Importantly, however, there has been and continues to be a significant amount of development in security measures and developing best practices used to implement secured communications. As a result, it is sometimes necessary to change the security measures or methods used to implement a particular process control protocol, such as the HART-IP protocol, to keep that protocol up to date with respect to the security measures or techniques being implemented. This updating or changing of the security measures or procedures used or implemented by devices conforming to a particular protocol, such as the HART-IP protocol, typically requires versioning the protocol so that different versions of the protocol can implement different security measures or techniques. Unfortunately, because different communication security measures may be implemented in various different versions of the same protocol (e.g., in HART-IP Version 1 as compared to HART-IP Version 2) it can be difficult if not impossible for devices of the same protocol that support different versions of the protocol to communicate with each other due to the different security measures associated with the different protocols. This incompatibility then leads to the need to replace older version devices (e.g., HART-IP Version 1 devices) whenever a newer version device (e.g., HART-IP Version 2 devices) is added to the system. This is time consuming and costly, especially because the installed base of older version devices can be significantly large.

SUMMARY

A system and method described herein provides a technique of negotiating and establishing security procedures to be implemented in a communication system that includes devices that conform to or that include different versions of the same communication protocol. While the system and methods described herein are described in particular with respect to the HART-IP protocol, in which HART-IP Version 1 devices include a different set of security procedures (e.g., a minimal set) as compared to HART-IP Version 2 (and greater) devices, these techniques can be used in any communication protocol in which different versions of the protocol specify the use of different security procedures or criteria for communications. In general, this system enables higher and lower protocol version devices (i.e., devices that conform to or that use the same communication protocol but that have different versions of the protocol installed therein) to communicate with one another in a secure manner, thereby making higher version devices added to a network backward compatible with lower version devices already within the network.

Generally speaking, to provide this backward compatibility, a client device and a server device on a network using a particular communication protocol (such as the HART-IP protocol), may, in the first instance, perform negotiations at a base security level (e.g., one associated with a lower version of the protocol) to determine the security protocols to use for the communications between the two devices, which security provisions may be based on the lowest or oldest version of the devices. For example, a client device (a data consumer such as a user interface, a historian or other database, a maintenance or control application, etc.) that conforms to the communication protocol, when establishing a communication session with a server device (a data provider such as a field device, a gateway, a process controller, etc.) that also conforms to the communication protocol, may first communicate in an unsecured manner (or using the security features of the lowest version of a communication protocol) to identify the version of the server device. This communication may be a request for a session initiation in which the client device requests the server for the server protocol version number. The server may then immediately respond with the protocol version number of the server and, thereafter, the client device continues with the session initiation using the security procedures called for by the version of the server. At this point, the server may be set to be unable to respond using any version lower than the current server version. In another example, the client device may be a lower version device and may tell the server to use the lower version security measures or procedures to perform communications with the client device. In either case, the initial establishment of communications performs and may be limited to determining the security provisions to use based on the versions supported by the two devices, with no other communications or data being able to be sent between the devices until the security provisions are established.

Thus, according to the method described herein, the devices on the network connect in an insecure or least secure mode, read the protocol version, and then agree to use the version number of one of the devices (e.g., the lowest or oldest version) to determine which set of security procedures to use, e.g., whether to run in a secure or an insecure mode of operation. The protocol then performs a start TLS after the secure mode has been determined. Moreover, the system may use the version number and optional features of the device to enable additional features such as safety features. The system may also use the initial handshake to retrieve capabilities of the device before completing the connection to the device. Still further, if desired, the system may keep the device (e.g., the server device) in a 'quarantine' state until the device secure/insecure connection sequence has been completed. Moreover, the system may not allow any additional communications to the server device until the secure/insecure mode of operation has been established. Moreover, if desired, the system may also authenticate the identity of the device (e.g., the server device) before it is removed from quarantined state.

DETAILED DESCRIPTION

Figure 1:
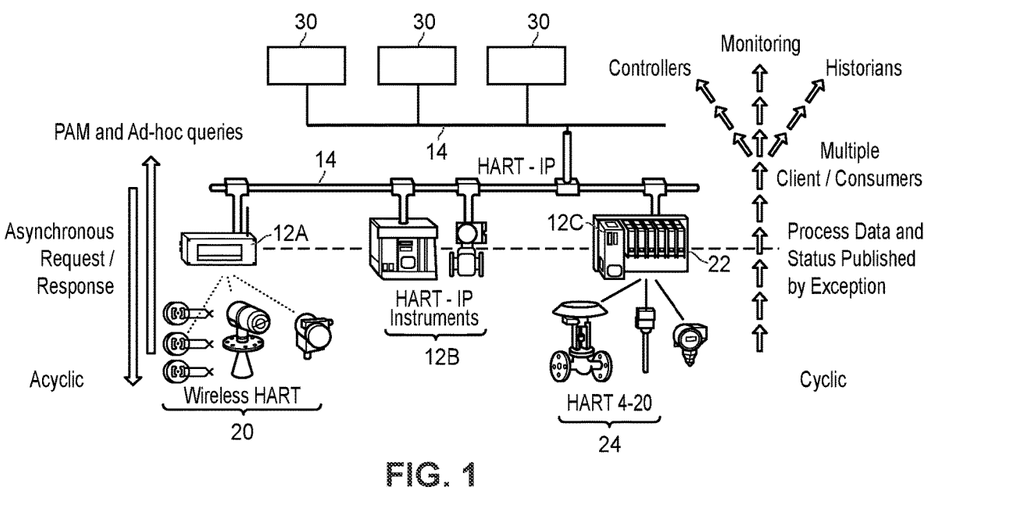
FIG. 1 is a block diagram that illustrates a system utilizing a HART-IP network to perform communications within a process plant or process environment.

Generally speaking, the HART-IP (Internet Protocol) serves as a high bandwidth connection between clients (data consumers) and servers (data producers). It combines the ubiquitous Internet Protocol network infrastructure and the HART network and application layers. As a result, plant personnel can utilize infrastructure already deployed and understood to provide HART compatible system connectivity, monitoring, control and integration. FIG. 1 depicts a typical HART-IP network 10 in which a set of HART-IP servers 12 are connected via a HART-IP bus 14. In this case, the HART-IP server 12A may be a WirelessHART gateway that is connected to various WirelessHART devices 20 via a WirelessHART network. Moreover, the servers 12B may be HART-IP field devices that communicate directly via HART-IP over the bus 14 and the server 12C may be one or more process controllers coupled via input/output (I/O) devices 22 to one or more traditional wired HART devices 24 (also referred to herein as HART 4-20 milliamp devices). Various HART-IP client devices 30, which may be, for example, user interface devices, process control operator or maintenance terminals, historians or other databases, etc. may be connected to the HART-IP network 14 and may communicate with and obtain data from the HART-IP servers 12 using the HART-IP protocol. Moreover, the communication modes supported by HART-IP are also illustrated in FIG. 1.

Generally speaking HART-IP, like all HART networks, supports two communication modes: Asynchronous Request/Response (polling) and Publish by Exception ("Burst-mode"). Request/Response supports acyclic communications like those typically used by Plant Asset Management (PAM) systems and other ad-hoc communications. All HART-IP Field Devices support both request/response communications and publishing of cyclic data. Moreover, all HART-IP, WirelessHART and HART 4-20 mA devices (traditional wired HART devices) support the same Application Layer. That means all HART-IP servers (Field Devices and I/O) support all Universal Commands. The same data are available for runtime process data (process values and status) and identifying data (Tag, Device Type, Manufacturer, Device Revision, Unique ID, etc.)

The HART-IP field devices 12B provide the same capabilities as found in WirelessHART field devices 20 or HART 4-20 mA field devices 24. Command 0 provides the basic identity information (device type, device profile, manufacturer, device revision, etc.) The device's Tag is read using Command 20 and process data via Commands 1-3, 9. Remote I/O has supported HART-IP (e.g., WirelessHART Gateways) since 2009. Remote I/O sets Command 0 Protocol Bridge Device bit in the Flags byte. Remote I/O must support the Common Practice I/O System Commands so that there is a standardized way to talk to instruments connected to the I/O.

HART-IP communications are session oriented. In other words, a HART-IP client 30 opens a session with a server 12 and the session remains open until the client 30 closes the communications. Typically a client session with a server 12 remains open for extended periods of time (perhaps indefinitely). Keep-Alive messages may be sent as needed to keep the session inactivity timeout from expiring.

Generally, a session begins with opening the IP port. All servers 12 support the HART-IP IANA well-known port 5094. Furthermore, all servers 12 allow an additional port to be configured to meet plant IT (Information Technology) and security needs. HART-IP is initialized using the Session-Initiate message which is use to perform security negotiations using the initiation of a session in the manner described below. Any other HART-IP message may result in the HART-IP server closing the IP connection.

Once the HART-IP session is established, normal HART communication may be performed using the HART Token-Passing (i.e., HART 4-20 mA) Data-Link Layer PDU or the HART Direct message PDU. HART communication begins (like normal host application communication) with short-frame Command 0 poll. This allows the address of the virtual HART device to be determined. HART-IP servers must support a single virtual HART device. Once the address has been determined, subsequent communication (both request/response and smart data publishing) uses HART unique long frame addresses. Client applications should immediately issue Command 20 to read the devices Tag.

Session-Initiate establishes the Inactivity Close timeout for the session. If the server has not received a message from the client for an Inactivity Close timeout period, the server will close the session and connection. If the client anticipates being idle for a longer time, then it must send a Keep-Alive message to confirm it wants the session to stay open. A Keep-Alive message, or any other client request message or a publish message from the server resets the Inactivity Close timer. Additionally, the client may use a Session-Close message to end the session.

Of course, security must always be considered when deploying IP-based equipment to ensure equipment and data are not compromised. Security is essential and all if the HART-IP servers 12 contain security. Key security features include (1) Authentication of Clients connecting to HART-IP Servers, (2) Secure communications using industry standard TLS/DTLS Cipher Suites, (3) A simple, single use session for initial provisioning of security credentials, (4) Audit Logs that summarize Server activity facilitating detection of rogue clients or abnormal activity, and (5) Syslogging of Server events to facilitate diagnosis of network-wide incidents/events. Of course, HART-IP Clients and Servers may support additional security measures and protocols as needed.

As noted above, HART enables communication with smart process instrumentation and controls, and supports both wired and wireless network topologies. HART-IP extends the applicable physical layers to all those that support TCP/IP communication. Possible Physical Layers include Ethernet (802.3), Wi-Fi (802.11), cellular, packet radio, satellite communications or even over RS232 using PPP.

A HART-IP network generally includes a variety of different device types including off-the-shelf internetworking components (infrastructure), client applications (e.g., plant monitoring and control systems), HART-IP enabled process instrumentation and I/O Systems (Remote I/O and WirelessHART Gateways). Standard network infrastructure equipment (switches, routers, bridges, etc.) is outside the scope of this document. As illustrated in FIG. 1, a HART-IP server may be a stand-alone Field Device, a Gateway (a type of HART I/O) connected to WirelessHART Field Devices or an I/O System connected to traditional 4-20 mA HART-enabled Field Devices. Devices such as a HART-IP to HART 4-20 mA adapter are also possible.

All communications between HART-IP clients and servers are session (connection) oriented. In order for data to be communicated, a session must be instantiated and maintained. Once the client-server connection is in-place, data is communicated using either acyclic request/response transactions or via cyclic smart data publishing.

However, HART-IP devices and networks need to implement security appropriate to the end-user application. Security is essential and HART-IP servers must implement at least a minimal set of security requirements. HART-IP servers must also be designed defensively. For example, malicious or suspect communications should result in session termination with the corresponding client.

HART-IP datagrams consist of the header and a payload. The header encapsulates and specifies the network PDU. Payload types include session datagrams to initiate and maintain the client-server connection; and Application Layer data payloads used for request/response communication and smart data publishing.

HART-IP sessions have a life cycle consisting of the client opening the session, communicating with the server, and closing the session. Client Applications are task oriented and should leave the session open for the duration of the task at hand. For example, a process control client should leave the session instantiated for an indefinite period (perhaps years). A PAM system should leave the session open only while performing the configuration or trouble-shooting task at hand.

HART-IP specifies two classes of devices: servers and clients. Servers typically connect to the plant process and generate process-related data. Clients provide a connection to (possibly many) servers for higher-level applications like control, monitoring and optimization, SCADA, or data historians.

A device can be both a client and a server. In that case, the device must listen for client connections like a normal HART-IP sever. Simultaneously, in its client role, it may open separate sessions to other servers. For example a flow computer could be a client with sessions to some servers performing basic measurements and act as a server with separate sessions for applications using the flow results.

HART-IP servers support session-oriented communications with clients. To instantiate a session, servers must listen to the well-known TCP/IP port 5094. However, some Host Systems/Clients may require another port be used for HART because of firewall configurations or other network infrastructure needs. Consequently, clients and servers must allow configuration of additional TCP/IP port numbers. The server must listen to both the additional TCP/IP port(s) and the well-known TCP/IP port.

Once the session is established, the HART-IP server must listen for HART-IP Client requests. The request is processed and a response is returned to the client that made the request. In addition to bidirectional request/response communication, servers must support unidirectional publishing of client-specified runtime process and status data (Common Practice Burst Message, Event Notification, etc.). Basic publishing is configured using Burst Message and Event Notification Commands. HART-IP clients subscribe to the published streams of interest using Client Application Subscriptions (See Common Practice Command Specification).

In addition, specific mandatory server requirements include supporting (1) at least 5 clients (sessions), (2) both the TCP and UDP, (3) Network Time Protocol (NTP) v4, and (4) Precision Time Protocol (PTP). HART-IP servers may use PTP and, if it not available, fall back to NTP. HART-IP servers may operate in SNTP mode provided the requirements in RFC 5905 are met. Timestamps and execution timing for runtime and status data may use the NTP/PTP source time, which ensures consistent, accurate times are used for Audit Logs, Syslog, Time-to-Apply Actions (see Command 536), etc.

HART-IP servers may support all HART Application Layer requirements. In addition, servers must support specified Common Practice Commands including publishing of bursts, events and notifications. HART-IP Servers may support publishing of Command 38 as a Burst Message.

A HART-IP server may support a single virtual HART device. That virtual device provides the HART Application Layer services. For example, the virtual device provides the Command 0 response to clients. All servers also include the following features Factory Reset; Identification and Addressing; Physical Addresses; and Field Upgrades.

In particular, all HART-IP servers include a manual/physical means to reset device to its factory settings. When reset, (1) all parameters, including calibration, etc., are reset to factory default values, Slot 0 Client records are set to their default values and all other client records may be set to cryptographically secure pseudo-random values; (2) the device Long Tag is initialized to the MAC address of the primary network interface controller (NIC) in canonical form (see RFC 2469) and contains each hexadecimal digit of the MAC address with each byte separated by a hyphen; (3) the Unit Tag is cleared—i.e., filled with zeroes (0x00); and (4) Supplemental UDP and TCP IP-ports are reset to default (5094) and burst messages are set to default (e.g., burst mode control may be set to "Enable Burst on HART-IP connection").

With respect to identification and addressing, servers may support IPv4 and IPV6 and IP addresses may be automatically acquired via DHCP. Moreover, all devices should include a label with its MAC address clearly shown in hyphenated form and servers should concatenate their "Process Unit Tag" and "Long Tag" and register the result as their HOSTNAME with the DNS Server.

Ultimately the Server's IP address is translated into a physical address. The form and requirements for physical addresses are Physical Layer (Ethernet, WiFi, cellular, packet radio, satellite communications, etc.) dependent. Ethernet and WiFi are widely used and their PHY-MAC addresses illustrate issues that the developer may face.

Ethernet and WiFi use the same PHY-MAC EUI-48 address structure. The EUI-48 address is 48bits long and (normally) consists of a three-byte Organizationally Unique Identifier (OUI) followed by a 3 byte value assigned by the manufacturer (like done with the HART Device ID). How a HART-IP device would get the EUI-48 address could vary: some MAC chips/interfaces come with the EUI-48 already assigned from the chip supplier. In other cases the EUI-48 must be written during manufacturing. In the latter case the developer may need to purchase an OUI from the IEEE. Ethernet/WiFi is one example and the developer must investigate the physical address assignment structure and mechanism of the PHY their HART-IP device is using. In any case, the PHY address for each device shipped must be unique.

Servers may also support field firmware upgrades (e.g., using HART Block Data Transfer). HART-IP field devices are connected to the Process or Plant Equipment and must provide the same Application Layer functionality as HART 4-20 mA or WirelessHART field devices. Moreover, a HART-IP Adapter provides an IP connection to a single HART-4-20 mA field device and adapters are transparent to clients (i.e., it appears to clients as a HART-IP field device). General adapter requirements include: (1) the adapter must cache the identity, status and runtime data from the connected HART 4-20 mA device. The adapter must cache all data identified in Table 1, (2) the adapter must publish runtime process and status data (if the connected HART 4-20 mA supports publishing, then the adapter must put the device into publish mode and if the device does not support publishing, then the Adapter must synthesize publishing support), and (3) when not responding to a command from its cache, to meet the response time requirements the adapter may issue a Delayed Response to any Command issued by the client.

HART-IP I/O Systems provide a single HART-IP connection point that concentrates communication streams with multiple HART-enabled devices. Typically, the I/O System acts as a bridge from a HART-IP network to HART 4-20 mA and WirelessHART devices. HART-IP I/O Systems must set bit 2 (Protocol Bridge Device) of the Identity Command (e.g., Command 0) byte 8 (Flags). HART-IP I/O must comply with the requirements found in the Section on "I/O System and Sub-Device Commands" including those for "Non-volatile Sub-Device Assignment" in the Common Practice Command Specification. Furthermore, HART-IP I/O must cache Command 0 and Command 20 responses while constructing or updating the list of connected devices returned in Command 84.

Communication Services

Upon reception of a Command 77 request the HART-IP I/O must evaluate the embedded command and respond immediately using the cached subdevice data. If the requested subdevice data is not in the cache the command request must be translated (reformatted) as needed and the request communicated to the destination field device.

Since the HART-IP I/O is a bridge it may initiate a Delayed Response for any command tunneled to a subdevice. The HART-IP I/O must maintain a complete list of all outstanding Delayed Responses. Any Delayed Responses pending for more than 24 hours must be purged.

HART-IP I/O must support at least 128-byte sub-device payloads (Application Layer data). Furthermore, the HART-IP I/O must support Block Transfers. Command 111 responses from field devices must be detected and the value of Maximum Segment Length modified if it is greater than that supported by the HART-IP I/O.

HART-IP I/O must monitor the Configuration Changed bit and issue Command 38 when it is set. The value of the Configuration Change Counter returned in Command 38 response must be cached. For HART 6 subdevices the HART-IP I/O must issue Command 0 to read and cache the Configuration Change Counter.

Cascaded Remote I/O and Adapters

HART I/O communicates with multiple sub-devices some of which could be, in turn, an I/O System (e.g., a WirelessHART Adapter; see Wireless Devices Specification). HART-IP I/O must detect all of the connected I/O Systems and their subdevices. All devices directly or indirectly connected to the I/O System must be returned in Command 84.

The I/O System s subdevices that are, in turn, I/O Systems are identified by examining byte 8 (Flags), bit 2 (Protocol Bridge Device) of the Identity Command (e.g., Command 0). The I/O System must poll the cascaded remote I/O using Command 84 to identify the cascaded subdevices. Once they are identified the I/O System must dispatch Command 0 and 20 retrieve the cascaded subdevices identity and tag. Command 0 and 20 response must be cached.

Caching Requirements

HART-IP I/O System must collect and maintain cached data from all connected subdevices for standard HART Commands. These cached data includes device identity, burst messages, and event notification data. HART-IP I/O must cache the responses to the Commands listed in Table 1 for each connected subdevice.

HART-IP I/O must support the "Cache Management" requirements found in the Wireless Command Specification. Including Commands 836, and 852-854. The I/O System must also support the Command 48 "Stale Data Notice" status in the "Standardized Status 2" byte and assert that bit when any cached data is stale. In addition, when the Device Variable is stale, the I/O System shall set Process Data Quality to "Bad" and the Limit Status to "Constant".

WirelessHART Gateway Detection of Burst Messages.

HART 4-20 mA publishes burst as the specific BACK PDU type (see Token-Passing Data-Link Layer Specification) so the burst messages are easy to identify and forward to subscribed clients. However, there is not a specific PDU for burst messages transmitted over WirelessHART.

In WirelessHART there are two classes of published messages: process and status data; and health reports. Process and status data include (for example) Commands 9, 38, and 48 responses. Health reports include (for example) Commands 779, 780, 787 and 846. Burst messages can be identified as follows:

Process and status data burst messages are Unicast, un-Acknowledged, and Response—The transport byte is [010 xxxxx] and the DLL Priority must be "Process-Data".
  Health report burst messages are Unicast, un-Acknowledged, and Response—The transport byte57 is [010 xxxxx] and the DLL Priority58 must be "Command".
  Once the burst messages are identified they must be forwarded to subscribed clients (see Commands 532 and 533).

HART-IP Clients

HART-IP communications is session oriented. In other words, a HART-IP client opens a session with a server and the session remains open until the client closes the communications. Typically a client session with a server remains open for extended periods of time (perhaps indefinitely). Keep-Alive messages may be sent as needed to keep the session inactivity timeout from expiring.

Once the session is established the client can initiate request/response transactions Request/response transactions are typically used by PAM systems and to perform infrequent ad-hoc device queries.

For continuous control and measurement clients subscribe to published runtime process and status data. Basic publishing is configured using Burst Message and Event Notification Commands. HART-IP clients subscribe to the published streams of interest using Client Application Subscriptions (See Common Practice Command Specification).

All clients should subscribe to Event Notification. Upon receiving an Event Notification, changes to devices status and the Configuration Change Counter must be identified. Changes in status should be forwarded to operations. Changes in the Configuration Change Counter should trigger the reread of the device configuration.

TABLE 1

Cached Response Messages

| HART Command | Command | Descriptor |
|---|---|---|
| Pre-read Subdevice Identity | 0 | Read Unique Identifier |
| | 12 | Read Message |
| | 15 | Read Device Information (Private Label Distributor code) |
| | 20 | Read Long Tag |
| Cached upon error-free READ | 0 | Read Unique Identifier |
| | 11 | Read Unique Identifier associated with Tag |
| | 12 | Read Message |
| | 13 | Read Tag, Descriptor, Date |
| | 14 | Read Primary Variable Transducer Information |
| | 15 | Read Device Information |
| | 20 | Read Long Tag |
| | 38 | Reset Configuration Changed Flag |
| | 48 | Read Additional Device Status |
| | 50 | Read Dynamic Variable Assignments |
| Burst Messages | 1 | Read Primary Variable |
| | 2 | Read Current & Percent |
| | 3 | Read All Variables |
| | 9 | Read Device Variables and Status (only supported for HART 6 and above) |
| | 33 | Read Device Variables |
| | 38 | Reset Configuration Changed Flag |
| | 93 | Read Trend - each burst contains all 12 Trend values. |
| Event Notification | 119 | Read Event Notification Status (Timestamp + Device Status + Command 48). |
| Cached upon error-free WRITE | 17 | Write Message |
| | 18 | Write Tag, Descriptor, Date |
| | 22 | Write Long Tag |
| | 35 | Write Primary Variable Range Values |
| | 38 | Reset Configuration Changed Flag |
| | 44 | Write Primary Variable Units |
| | 51 | Write Dynamic Variable Assignments |

In addition to native HART-IP enabled field devices, some HART-IP servers are I/O Systems. I/O Systems act as bridges to HART 4-20 mA and WirelessHART networks. The I/O Systems have multiple subdevices and client applications identify the subdevices using Command 84. Whether it is published data or request/response transactions, communication with the subdevices must be tunneled (encapsulated) using Command 77.

Client/Server Compatibility

According the description provided herein, it is possible to operate HART-IP Clients and Servers in networks with a mixture of HART-IP Version numbers. Newer Clients may interoperate with older Servers and vice-versa.

Table 2 summarizes operation for maximum Client/Server compatibility.

In general, in one case, clients attempt to open a HART-IP session using maximum version the client supports. As a fallback, if no response is received, the client may then try successively lower version numbers as some servers may not answer large version numbers.

When the server responds, the response may indicate the maximum version the server supports. As HART-IP products, including clients, have been in the field for over a decade, servers may make an exception for clients supporting version 1. For example, when a session initiate is received from a version 1 client the server may also respond indicating version 1.

TABLE 2

Client/Server Compatible Operating Mode Summary

| Client Version | Server Version 1 | 2 | 3+ |
|---|---|---|---|
| 1 | Server responds to Session Initiate normally. No Security. | Server must respond to Session Initiate with Version = 1 No Security | Server does not respond to Version 1 Clients. Beginning with Version 3 Servers shall only operate in secure mode. |
| 2+ | Server responds to Session Initiate normally. Client must operate in Version 1 mode. If Server does not respond then Client must retry with Version set to 1. No Security. | Server responds to Session Initiate normally. Server shall not respond to any further HART-IP communications until a secure TLS/DTLS session is established Upon receiving the Session Initiate response the Client must initiate the TLS/DTLS handshake and establish secure communications with the Server. | |

When both the client and the server are version 2 and later, secure communications must be initialized immediately after exchanging session initiate messages.

Thus, in one example, a client device may attempt to establish a communication connection with a server device, wherein the client device uses or supports a higher (newer) version of the IP communication protocol, and in particular, a version of the IP communication protocol that uses more or different security features then the lower or earlier version of the IP communication protocol. In this case, the client device may attempt to communicate with the server using the communications that indicate that the client device supports a higher or newer version of the communication protocol (e.g., version 2 or 3), such as by sending a session initiation request indicating that the protocol version of the client device is 2 or 3. Of course, if the server supports the higher version protocol (the maximum version supported by the client device), then the server may establish secured communication with the client device using the security provisions or features established by or associated with the higher or later version of the communication protocol being used by or supported by the client device, as indicted in the session initiation message. If, on the other hand, the server does not support the higher or later version of the communication protocol, the server may simply ignore the session initiation request from the client or may respond with a message indicating the highest version of the communication protocol that the server supports.

If the server ignores the message, the client device may, after a time-out period, send a further communication, such as a further session initiation request, with an older or lower version of the communication protocol to enable the server to respond if the server supports that older or lower version of the communication protocol. Thus, for example, if the client supports version 3 of the communication protocol but the server supports version 1 of the communication protocol, the client may initially send a first initiation request indicating version 3 of the communication protocol. As the server does not support this version, the server may ignore the message. After a time-out period, the client may then send a second initiation request indicting version 2 of the communication protocol. Here again, in this example, the server may ignore this request as the server does not support version 2 of the protocol. Next, after a time-out period, the client may send another initiation request indicating version 1 of the communication protocol. The server, which supports version 1 of the communication protocol, may then respond to the initiation request using the security provisions (if any) of version 1 of the communication protocol and a communication session is then established between the client device and the server device using the security features or provisions of version 1 of the communication protocol (even though the client device supports a higher version of the communication protocol).

In the case in which the server device is able to respond to an initial communication initiation request indicating a higher version of the communication protocol not supported by the server, the server may indicate, in a response, the highest version of the communication protocol supported by the server. The client device may then establish a communication connection using the security features of the highest version of the communication protocol supported by the server (as indicated in the server response to the session initiation request).

In another example, in which the server device supports a later or higher version of the communication protocol than the client device, the client device may again, send an initiation request indicating the highest version of the communication protocol that the client device supports. The server may then respond to the session initiation request and establish a communication session using the security features of the highest version of the communication protocol supported by the client device even if this is not the highest version supported by the server device. Thereafter, a communication session is established using the security features of the version of the communication protocol associated with the client device.

In still another example, in which the client and server devices may support different versions of the communication protocol, the client and the server device may initially establish or perform communications using the security features of a lower or even the lowest version of the communication protocol to initially communicate with each other. In this initial communication, the client and/or server device may indicate the highest or latest version of the communication protocol that it/they support and then both devices may complete the initiation using the security features of the lowest or oldest version specified in these communications by the client device and the server device (that is, the older or lowest version of the communication protocol that is selected from the highest versions of the protocol supported by the client device and the server device). The selected version will thus be the highest version of the communication protocol supported by both devices. Thereafter, the communication initiation request may be completed using the security features of the highest version of communication protocol supported by both devices.

In all of these manners, the client and server device perform a negotiation during the initial session request communications to determine which security features to use in subsequent communications between the two devices, which will be the security features of highest or latest version of the communication protocol supported by both devices.

In one example, the lowest version of the communication protocol, may use unsecured or only a minimal set of communication security procedures or features, while higher or later versions of the communication protocol may use more or higher levels of security features for performing communications, such as encryption, private and public keys, etc. Thus, in some cases, the client and server devices may initially connect in an insecure mode, may read or establish the highest protocol version supported by both devices, and may then use this version number to determine whether to run in a secure or an insecure mode of operation. The protocol may then perform a start TLS using the established security features of the determined version after the secure mode has been determined. As a result, it may be important to limit the communications between the client and server device using a lower or the lowest version of the communication protocol as much as possible (which may include unsecured communications) to reduce or prevent unauthorized communications with or between the devices over the communication network within the process control system. To further secure communications and/or to reduce the threat of unauthorized intrusions into the system, the communication protocol may keep one of the devices (e.g., the server device) in a 'quarantine' state until the device secure/insecure connection sequence has been completed so that the quarantined device (e.g., the server device) cannot communicate any other information or messages to the client device (or any other device on the network) until after the connection sequence is completed and the maximum security provisions are being implemented. Still further, the protocol may prevent any additional communications to the new or quarantined device (e.g., the server device) until the secure/insecure mode of operation has been established. Likewise, the communication or session connection sequence may require that the identity of the new device (e.g., the server device) must be authenticated before the device (e.g., the server device) is removed from the quarantined state.

Still further, if desired, the protocol may use the initial handshake between the client and server devices to retrieve capabilities of the device (e.g., the server device) before completing the connection to the device. Moreover, these additional features or capabilities of the devices (i.e., one or both of the server and the client devices) may be enabled based on a combination of the maximum or latest communication protocol version number supported by and the optional features of one or both of the two devices. Thus, the devices may enable additional features such as safety features of a device (either a server or a client device) based on the features of the device and the version number of the protocol being used in the communications between the devices. In this manner, certain device features, such as safety features, may be enabled or disabled based on the protocol version being used to establish communications between the server and the client (as it may be that certain device features should not be used in a situation in which communications are being performed between the server and the client device in over an unsecured communication link, or using security features of a lower version of the communication protocol).

HART-IP Security

All devices must implement security appropriate to the end-user application. In addition, all products must implement at least all of the security features including requirements for: (1) Communication security based on Transport Layer Security (TLS) and Datagram Transport Layer Security (DTLS); (2) HART-IP Server local, non-volatile Audit Logs; (3) Publishing syslog messages; and (4) Secure operation of the products themselves.

Security best-practices for IP-based products continue to evolve. Consequently, all products may be upgraded to allow the addition of improved security mechanisms in the future.

Communication Security

HART-IP devices (servers and clients) support many communication security protocols, including TLS Version 1.2 and later; and DTLS Version 1.2 and later.

Mandatory Initial Security Provisioning

Still further, to implement the security provisions herein, initial security provisioning must be performed to enable the device to be deployed and made operational. Upon Factory Reset all security credentials shall be cleared and Slot 0 Client records set to their default values. In addition, an initial, single-use session shall become immediately available. Any client (Version 1 or 2) will connect to this initial session. If the initial connection is via a Version 1 client then no security credential can be entered.

If the initial session is with a Version 2 client then secure communications are initiated using the default authentication shown below and perform the initial security provisioning. The user should perform this initial provisioning on the bench along with all other routine device provisioning (e.g., setting unit codes, burst mode parameters, etc.). The following properties should be provisioned: (1) Long Tag (Command 22); (2) Process Unit Tag (Command 521); (3) syslogging parameters (Commands 544-547); and (4) At least one set of security credentials (e.g. Commands 541 or 542) for the Slot 0 Client (the HART-IP Security Manager).

Security credentials in the Slot 0 Client record not written during that initial session may be changed to a cryptographically secure pseudo-random value. Upon closing the initial session: (1) If no security credentials are provisioned during this initial session then Servers shall decline (i.e., not answer) all subsequent session Initiate requests from Version 2 clients and (2) If any security credentials are provisioned during this initial session then all the sessions with Version 1 Clients shall be disallowed. In other words, Session Initiate requests from a Version 1 Client should not be answered.

In summary, after the first, single-use session, the server will be locked to only Version 1 or only Version 2 Clients.

Client Records

All HART-IP Servers shall support a minimum of 5 Client records (i.e., Slots 0-4) for each cipher suit supported. The Client record shall consist of at least: (1) Client Identity; (2) Security credentials (e.g., password or PSK); and (3) Client options (e.g., Read-Only)

Slot 0 identifies the client that acts as the HART-IP security manager. In other words only the Slot 0 Client may modify the client records (e.g., change the security credentials). The server must close the session should any other client attempts to change any client record. Client records are Write-Only. The HART-IP security manager must track and manage slot assignment and client security configuration.

Client Identity

The client identity is the default value written to the Slot 0 Client Record(s) upon Factory Reset. Moreover, the HART-IP security manager may configure a client to be Read-Only. Any attempt by a Read-Only client to write to the server shall result in the server closing the session.

Controller Client

The HART-IP Security Manager may configure a Client to be a Controller. Only a Controller may write setpoints.

TLS Cipher Suites

Devices may support the TLS Cipher Suites in Table 3. HART-IP devices shall indicate TLS Cipher Suite preference in the order listed in the table (first table entry is most preferred and last entry least preferred). HART-IP servers may support additional TLS Cipher Suites or other security methodologies, as needed, to ensure uninterrupted mission success or meet end customer requirements.

TABLE 3

HART-IP TLS Cipher Suites

| Value | Description | Reference |
|---|---|---|
| 0x00, 0xA8 | TLS_PSK_WITH_AES_128_GCM_SHA256 | RFC 5487 |
| 0x00, 0xAE | TLS_PSK_WITH_AES_128_CBC_SHA256 | RFC 5487 |
| 0xC0, 0xA4 | TLS_PSK_WITH_AES_128_CCM | RFC 6655 |
| 0xC0, 0x1D | TLS_SRP_SHA_WITH_AES_128_CBC_SHA | RFC 5054 |

Common Practice Commands are provided for provisioning the security credentials. These commands shall be rejected if received during an insecure session and the server must return the "Access Restricted" Response Code.

The PSK shall be written using Common Practice Command "Write Client Pre-Shared Key".

Audit Logs

The server shall record the following in its local, volatile Audit Logs Last time/date the server was powered up; (1) The last time/date the security credentials were modified; (2) Server Status; and (3) Circular 128 entry Session Summary list. Moreover, each Session Summary record shall consist of: (1) Client identity including IP addresses (IPv4, IPv6) and Port Numbers; (2) Connect/disconnect time/date for that client; (3) Starting/ending Configuration Change Counter; (4) Session status; and (5) Communications counters indicating the number of publish (burst), request, and response PDUs.

syslogs

Devices shall also support/push "syslog" messages. Syslog messages are pushed to Security Information and Event Management (SIEM) systems and are critical to detecting security attacks and unauthorized manipulation of HART-IP Servers. Detection enables improvements to plant security policies and procedures to minimize vulnerabilities.

HART-IP syslog messages shall be published-retention of syslog messages in the field device is optional. All HART-IP servers must support syslogging syslog Servers The network is syslog server is the destination for syslog messages (in this case the HART-IP Server is the syslog client). When the HART-IP Server is provisioned with its security credentials and tag the syslogging must also be provisioned including writing the syslog server HOSTNAME; IP Port; PSK and Password.

Upon power-up the HART-IP Server shall attempt to connect to the syslog server using the following procedure:

Using the syslog servers HOSTNAME and DNS the IP address for the syslog server is acquired.

The HART-IP Server attempts to connect to the syslog server using TLS via the specified IP Port.

Failing that connection shall be attempted via the default secure syslog Port (6514)

Failing to connect via TLS the HART-IP Server shall attempt to connect insecurely via the specified port followed by attempting to connect via the default insecure syslog Port (514).

If connection is successful then syslog messages shall be transmitted to the syslog server. If secure TLS connection was made then syslogging is via TCP. If insecure communications was established syslogging is via UDP. Status of the syslogging shall be indicated in the audit logs "Server Status" field.

TABLE 4

Summary of syslog Fields

| Field | Format | Description |
|---|---|---|
| priority | facilities *8 + severities | The facilities and severities codes are defined in RFC 3164 "syslog Message Facilities" and "syslog Message Severities". Priority is depicted as a decimal value. |
| timestamp | yyyy-mm-ddThh:mm:ss.ssZ | timestamp shall be formatted per RFC 5424. The timestamp includes the date and time. For example 1985-04-12T23:20:50.52Z |
| hostname | Process Unit Tag-Long Tag | The device's hostname |
| manufacturer | 0xmmmm mfr-text$_{opt}$ | mmmm is the Manufacturer Identification Code (in hexadecimal) returned in Command 0 mfr-text is optional manufacturer name string |
| product | 0xeeee product-text$_{opt}$ | eeee is the Expanded Device Type (in hexadecimal) returned in Command 0 product-text is optional product name string |
| Device Revision | 0xrr | rr is the Device Revision (in hexadecimal) returned in Command 0 |
| event-id | decimal-value | The event number for this syslog message. Message IDs must be in the range of 0-65 535. Message IDs 0-32 767 are reserved for use by the HART Protocol. |
| event-description | description-text | The event-description is human readable text that explains what the event is. |
| severity | decimal-value | Severity is a decimal value from 0 (low) to 10 (very high/emergency). |
| extensions | key=value | A series of space-separated key-value pairs. The key is separated from the value by an equals sign. |

TABLE 5

Mandatory syslog extensions

| Order | Key | Value | Description/Example |
|---|---|---|---|
| 0 | DeviceId | 0xdddddd | dddddd is the Device ID (in hexadecimal) returned in Command 0 DeviceId=0x47F2D3 |
| 1 | src | IPv4 Address | The Server's IPv4 address. src=10.3.101.127 |
|  | c6a2 | IPV6 Address | The Server's IPV6 address. c6a2=2001:1265:0:0:AE4:0:5B:6B0 |
| 2 | dst | IPv4 Address | The Client's IPv4 address. dst=10.3.101.33 |
|  | c6a3 | IPV6 Address | The Client's IPV6 address. c6a3=2001:1265:0:0:AE4:0:5B:480 |

HART-IP PDU

Figure 2:
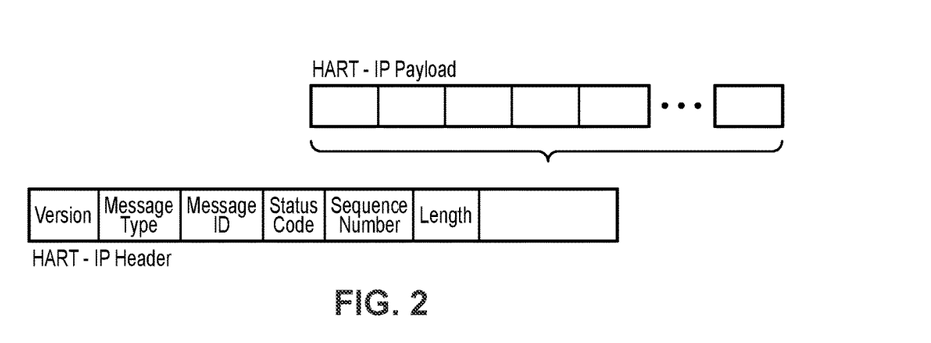
FIG. 2 illustrates a graph depicting a HART-IP PDU Format with embedded token-passing PDU.

The HART-IP PDU (see FIG. 2) consists of the header and payload. The header identifies the transaction contained in the HART-IP message (e.g., Request, Response, Publish) and the payload. The HART-IP header is created and consumed by the client/server. The Payload, depending on the Message ID, is directed to either the HART-IP client/server or to the HART Application Layer device/host. For example, the Token-Passing Data-Link Layer PDU is addressed to the virtual HART device within the HART-IP server. The virtual HART device is responsible for HART Application Layer transactions.

The HART-IP PDU Header is fixed size and all fields are mandatory. The HART-IP PDU Header is specified in Table 6 and in the following Subsections. If the HART-IP Header, or any its values, are invalid the session must be closed and the PDU discarded.

Version

This field must be set to the version of the protocol used by the device currently (2). In future updates to this specification, the Version may be incremented. Servers must reply to Session Initiate messages no matter the Version number in the request. Servers must reply to Session Initiate request with the version number from the client. The response from the server will indicate to the client what Version the server supports. Clients and server must be backwards compatible with all previous Versions.

Message Type

This field indicates the type of message (e.g., Request, Response, Publish, NAK) contained in the PDU. In addition, the Message Type tells the server how to manage the sequence number. For a Request message, the server copies the sequence number into the response. If the device is sending a publish message it must use its self-generated current publish sequence number.

Clients shall only issue Request or Publish messages and servers shall only reply to Request messages. If any reserved bits are set in the clients message type field, the server shall discard Request message and close the session. Clients shall ignore all reserved bits.

Clients may also issue Publish messages (e.g., to write setpoints). Servers must validate the Client Publish messages and close the session if it is malformed or invalid. Valid Publish must be used (if supported by the device) or discarded (if not supported by the device).

Servers issue Response, Publish or NAK messages. The server may respond to a Request with a NAK message instead of the normal Response message. The NAK indicates that all of its resources are currently allocated. The client must then pause additional Requests for a period of time before making the Request again. The NAK allows the server to control/throttle message flow control based on resources. If the message type is NAK, there is no payload.

Servers must support publishing of bursts, events and notifications (see Common Practice Command Specification). Publishing to the client shall begin upon receiving the client Subscription (see Commands 532 and 533). The Publish messages are inserted into the session message stream based on the burst, event or notification configuration. I/O Systems shall Publish all burst, event and notifications received from the subdevices.

TABLE 6

HART-IP PDU Header Specification

| Parameter | Byte | Format | Description | Client | Server |
|---|---|---|---|---|---|
| Version | 0 | Unsigned-8 | Version of HART-IP Protocol (currently 2) | Client must initialize to 2 | Recopied by the server from the Request |
| Message Type | 1.7-1.4 | Bits-4 | Bits 1.4-1,7 = Reserved | Client must initialize to 0. | Server must initialize to 0 |
|  | 1.3-1.0 | Enum-4 | Message Type:<br>0 = Request<br>1 = Response<br>2 = Publish<br>15 = NAK<br>All other values = Reserved (Invalid) | Client must initialize to Request, or Publish | Server initialized to Response, Publish or NAK |
| Message ID | 2 | Enum-8 | Message Identifier (ID):<br>0 = Session Initiate<br>1 = Session Close<br>2 = Keep Alive<br>3 = Token-Passing PDU<br>4 = Direct PDU<br>5 = Read Audit Log<br>All other values = Reserved (Invalid) | Client initialized | Recopied by the server from request |

TABLE 6-continued

HART-IP PDU Header Specification

| Parameter | Byte | Format | Description | Client | Server |
|---|---|---|---|---|---|
| Status Code | 3 | Enum-8 | Overall communication status for the message. Status values for Response messages are listed in the following section based on message identifier. | Client must initialize to Success (0) | Set by the server |
| Sequence Number | 4-5 | Unsigned-16 | Unique sequence number for mapping a response to a request. This must be unique for all messages, including those used for DRM. | Client initialized | Recopied by the server from request. |
| Length | 6-7 | Unsigned-16 | Number of bytes in the message including message header and payload. | Client initialized | Server initialized |

Message ID

The Message ID describes the payload of the PDU. The legal, valid Message ID are Session Initiate; Session Close; Keep Alive; Token-Passing PDU; and Direct PDU. If a server receives any other Message ID value, it must discard the PDU and close the session.

Status Code

The Status Code is returned in each Response. It is an indication of the status of the particular message identifier sent and indicates if any warnings or errors occurred in the UDP or TCP messaging. The Status Code is separate and independent of the Response Code included in embedded HART Application Layer commands.

The valid Status Codes for each Message ID is specified below.

Sequence Number

A client may initialize the Sequence Number to any value with the session initiation. From that point forward it must increment the Sequence Number. When the Sequence Number reaches the maximum value it must wrap to zero.

When a new session is initialized, the device must initialize the publish/notification Sequence Number to a random value for any publish/notification messages it will send. The Sequence Number must be incremented by the device as each publish/notification message is sent.

Length

The Length field specifies the total number of bytes in the header plus the payload. When receiving a HART-IP PDU the fixed-size header must be read first. Then Length field must be used to calculate the payload size and then the balance of the PDU read. If the size of the received PDU does not match the Length then the session must be closed and the PDU discarded.

If the Length exceeds the buffer size supported by the device then the complete PDU must be received, discarded, and the session must be closed. Devices must support HART-IP PDU with Length of at least 384 bytes.

HART-IP PDU Payloads

The payload starts at the first byte after the HART header. This subsection specifies the format and content of the payload for each Message ID.

As is HART standard practice for forward compatibility, data items may be added to these Message ID's in the future. All devices (clients and servers) must ignore the additional bytes and react normally when they are present.

Session Initiate (Message ID=0) (Mandatory) This message is used to initiate (open) a session between a client and a server. This message must be exchanged with the server before any other message will be accepted from the client. If messages are sent to the server before a session has been initiated, the server must discard the message and not reply.

To open a connection to a server, the client sends the Session Initiate request via either the well-known or user designated port to the server. If a successful exchange occurs, the server returns the response either from the well-known port or from a previously unused UDP (ephemeral) port. Once open, the client shall use the port receiving the response to send and receive all subsequent messages for the session.

The server limits active sessions based on available resources. If the server is unable to initiate the session because all available sessions are used, it must return the "All Available Sessions in Use" status to the client.

When initiating a UDP or TCP session, the client must specify an "Inactivity Close Time". If the server loses communication with the client (based on the Inactivity Close Time lapsing) the server must close the session. For TCP sessions only, the Inactivity Close Time may be set to zero (0). When this occurs, the port will stay open based on the TCP KEEPALIVE settings. The server Response must contain the actual values used by the server ("Set to Nearest Possible Value" must be returned if the response value differs from the request value).

The session will be closed if the server receives a Session Close message or the Session Inactivity Timeout occurs.

Request Data Bytes

| Parameter | Byte | Format | Description |
|---|---|---|---|
| Master Type | 0 | Unsigned-8 | 1 = Primary Master<br>All other values = Invalid |
| Inactivity Close Time | 1-4 | Unsigned-32 | Inactivity Close Time. Milliseconds of inactivity before the session is closed. Values between 10 minutes and 1 second must be supported. The default value shall be 90 seconds. |

Response Data Bytes

| Parameter | Byte | Format | Description |
|---|---|---|---|
| Master Type | 0 | Unsigned-8 | 1 = Primary Master |
| Inactivity Close Time | 1-4 | Unsigned-32 | Actual inactivity time value set for the server |

Status Codes

| Code | Class | Description |
|---|---|---|
| 0 | Success | No error occurred |
| 1 | | Undefined |
| 2 | Error | Invalid Selection (Invalid Master Type) |
| | | Deprecated (for security) |
| 3-4 | | Undefined |
| 5 | Error | Too Few Data Bytes Received |
| 6 | Error | Device Specific Command Error |
| 7 | | Undefined |
| 8 | Warning | Set to Nearest Possible Value (Inactivity value) |
| 9 | Error | Security not initialized. Factory reset required. |
| 10-13 | | Undefined |
| 14 | Warning | HART-IP Protocol Version not supported (version number in the HART-IP PDU Header is larger than support by the server). |
| 15 | Error | All Available Sessions In Use |
| 16 | Error | Access Restricted, Session already established |
| 17-29 | | Undefined |
| 30 | Warning | Insecure session already exists (read Audit Log to determine insecure clients) |
| 31-255 | | Undefined |

Session Close (Message ID=1) (Mandatory) This message is used by the HART Host application/client to request the server close a session. For TCP, the session is closed whenever the socket for this session is closed for any reason.

Status Codes

| Code | Class | Description |
|---|---|---|
| 0 | Success | No error occurred |
| 1-5 | | Undefined |
| 6 | Error | Device Specific Command Error |
| 7-255 | | Undefined |

Keep Alive (Message ID=2) (Mandatory) The client must transmit this message periodically when no other communications with the server are occurring to keep the session active/open. This message must be sent only when communication has been inactive for between 80% and 95% the "Inactivity Close Time".

Status Codes

| Code | Class | Description |
|---|---|---|
| 0 | Success | No error occurred |
| 1-5 | | Undefined |
| 6 | Error | Device Specific Command Error |
| 7-255 | | Undefined |

HART Token-Passing Data-Link Layer PDU (Message ID=3) (Mandatory) This message embeds a full Token-Passing Data Link Layer formatted message as the payload. Preambles are a PHY requirement and, thus, not included with the Token-Passing Data-Link Layer PDU. The format of the response must take the same format as the request. Delimiter and Address fields must comply with Token-Passing Data-Link Layer requirements. HART-IP clients are always "Primary Masters" and the MSBit of the Address field must be set in all Server responses. Burst-Mode bit shall be reset.

Request Data Bytes

| Parameter | Byte | Format | Description |
|---|---|---|---|
| Delimiter | 0 | Unsigned-8 | |
| Address | | Unsigned-8 or Unsigned-40 | Address length depends on Delimiter value |
| Command | | Unsigned-8 | |
| Byte Count | | Unsigned-8 | |
| Data | | Unsigned-8 [ ] | |
| Check Byte | | Unsigned-8 | |

Response Data Bytes

| Parameter | Byte | Format | Description |
|---|---|---|---|
| Delimiter | 0 | Unsigned-8 | |
| Address | | Unsigned-8 or Unsigned-40 | Address length depends on Delimiter value |
| Command | | Unsigned-8 | |
| Byte Count | | Unsigned-8 | |
| Data | | Unsigned-8 [ ] | First byte is Response Code for the Command |
| Check Byte | | Unsigned-8 | |

Status Codes

| Code | Class | Description |
|---|---|---|
| 0 | Success | No error occurred |
| 1-4 | | Undefined |
| 5 | Error | Too Few Data Bytes Received |
| 6 | Error | Device Specific Command Error |
| 7-15 | | Undefined |
| 16 | Error | Access Restricted |
| 17-34 | | Undefined |

Figure 3:
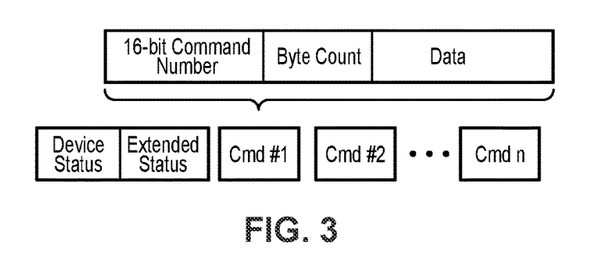
FIG. 3 depicts an example of a HART Direct PDU.

HART Direct PDU (Message ID=4) (Mandatory): The HART Direct PDU allows multiple commands to be communicated to the HART-IP Server without the overhead found in the HART Token-Passing Data-Link Layer PDU (Message ID 3). For example, once the session is established Command 0 and Command 20 can be sent in one transaction to complete the identification of the HART-IP device. The Direct PDU contains the Device Status, Extended Status and a series of Application Layer commands (see FIG. 3). Commands consist of a 16-bit command number, byte count, and data. Devices must parse each embedded command in order generating the appropriate response data and Response Code. See Command 78 (in the Common Practice Command Specification) for more information.

On HART-IP networks, multiple, pending Burst Messages should be aggregated into a single transaction. The Client must set the Device Status and Extended Status fields to 0. In the Server response the first Data byte for each command is always the Response Code for that command.

Request Data Bytes

| Parameter | Byte | Format | Description |
|---|---|---|---|
| Device Status | | Bits-8 | |
| Extended Status | | Bits-8 | |
| Command | | Unsigned-16 | Command A |
| Byte Count | | Unsigned-8 | |
| Data | | Unsigned-8 [ ] | |
| Command | | Unsigned-16 | Command B |
| Byte Count | | Unsigned-8 | |
| Data | | Unsigned-8 [ ] | |
| . . . | . . . | . . . | . . . |
| Command | | Unsigned-16 | Command n |
| Byte Count | | Unsigned-8 | |
| Data | | Unsigned-8 [ ] | |

Response Data Bytes

| Parameter | Byte | Format | Description |
|---|---|---|---|
| Device Status | | Bits-8 | |
| Extended Status | | Bits-8 | |
| Command | | Unsigned-16 | Command A |
| Byte Count | | Unsigned-8 | |
| Data | | Unsigned-8 [ ] | First byte is Response Code for the Command |
| Command | | Unsigned-16 | Command B |
| Byte Count | | Unsigned-8 | |
| Data | | Unsigned-8 [ ] | First byte is Response Code for the Command |
| . . . | . . . | . . . | . . . |
| Command | | Unsigned-16 | Command n |

Response Data Bytes

| Parameter | Byte | Format | Description |
|---|---|---|---|
| Byte Count | | Unsigned-8 | |
| Data | | Unsigned-8 [ ] | First byte is Response Code for the Command |

Status Codes

| Code | Class | Description |
|---|---|---|
| 0 | Success | No error occurred |
| 1- 4 | | Undefined |
| 5 | Error | Too Few Data Bytes Received |
| 6 | Error | Device Specific Command Error |
| 7-15 | | Undefined |
| 16 | Error | Access Restricted |
| 17 - 255 | | Undefined |

Read Audit Log (Message ID=5): (Mandatory) All servers must maintain a volatile Audit Log. All servers must support this HART-IP message allowing the Audit Log to be read. Servers must support 128 Session Log Records.

Request Data Bytes

| Parameter | Byte | Format | Description |
|---|---|---|---|
| Start Record | 0 | Unsigned-8 | |
| Number of Records | 1 | Unsigned-8 | |

Response Data Bytes

| Parameter | Byte | Format | Description |
|---|---|---|---|
| Start Record | 0 | Unsigned-8 | |
| Number of Records | 1 | Unsigned-8 | |
| Power-up Time | 2-9 | Unsigned-64 | "time_t" Last time/date the server was powered up |
| Last Security Change | 10-17 | Unsigned-64 | "time_t" The last time/date the security credentials were modified. Last Security Change shall be set to Power-Up Time if security has not been changed since last time the device was powered up. |
| Server Status | 18-19 | Unsigned-16 | Server Status. Individual status bits defined as 0x0001 = Unable to locate syslog Server 0x0002 = Syslog Server located but Connection Failed 0x0004 = Insecure syslog connection All other bits shall be set to 0 (i.e., reset) |
| Session Record Size | 20-21 | Unsigned-16 | |
| | | | First Session Log Record |
| Client IPv4 Address | 22-25 | Unsigned-32 | Client IP address IPv4 (null if not IPv4) |
| Client IPV6 Address | 26-41 | Unsigned-128 | Client IP address IPV6 (null if not IPV6) |
| Client Port | 42-43 | Unsigned-16 | Client IP Port Number |
| Server Port | 44-45 | Unsigned-16 | Server IP Port Number |
| Connect Time | 46-53 | Unsigned-64 | "time_t" Connect time/date for that client |
| Disconnect | 54- | Unsigned- | "time t" Disconnect time/date for that client. The |

-continued

Response Data Bytes

| Parameter | Byte | Format | Description |
| --- | --- | --- | --- |
| Time | 61 | 64 | disconnect time shall be set to −1 (0xFFFF FFFF FFFF FFFF) if the client is still connected. |
| Session Status Summary | 62-63 | Unsigned-16 | Session Status. Individual status bits defined as 0x0001 = Writes Occurred 0x0002 = Bad Session Initialization 0x0004 = Aborted Session 0x0008 = Session Timeout 0x0010 = In-Secure Session All other bits shall be set to 0 (i.e., reset) |
| Start Configuration Change Count | 64-65 | Unsigned-16 | Starting Configuration Change Counter |
| End Configuration Change Count | 66-67 | Unsigned-16 | Ending Configuration Change Counter. The value of the Ending Configuration Changed Counter is undefined while the session is open. |
| No. Publish PDUs | 68-71 | Unsigned-32 | Number of Publish (Burst) PDUs |
| No. Request PDUs | 72-75 | Unsigned-32 | Number of Request PDUs |
| No. Response PDUs | 76-79 | Unsigned-32 | Number of Response PDUs |
| . . . | | | Second through $n^{th}$ Session Log Record |

Status Codes

| Code | Class | Description |
| --- | --- | --- |
| 0 | Success | No error occurred |
| 1-5 | | Undefined |
| 6 | Error | Device Specific Command Error |
| 7 | | Undefined |
| 8 | Warning | Set to Nearest Possible Value (e.g., Start Record and/or Number of Records adjusted) |
| 9-255 | | Undefined |

Prior to initiating a HART-IP session the client must locate the server. This may be accomplished through manual entry of the Servers IP address. However, the recommended methodology is looking up the Server in the DNS server using its Process Unit Tag-Long Tag. Once the Server is found, Normal operation begins (see FIG. 4) with a Session Initiate transaction. Here, the client sends a Session Initiate (Message ID=0) request. The server sends the session initiate response with the actual Inactivity Close Time.

Figure 4:
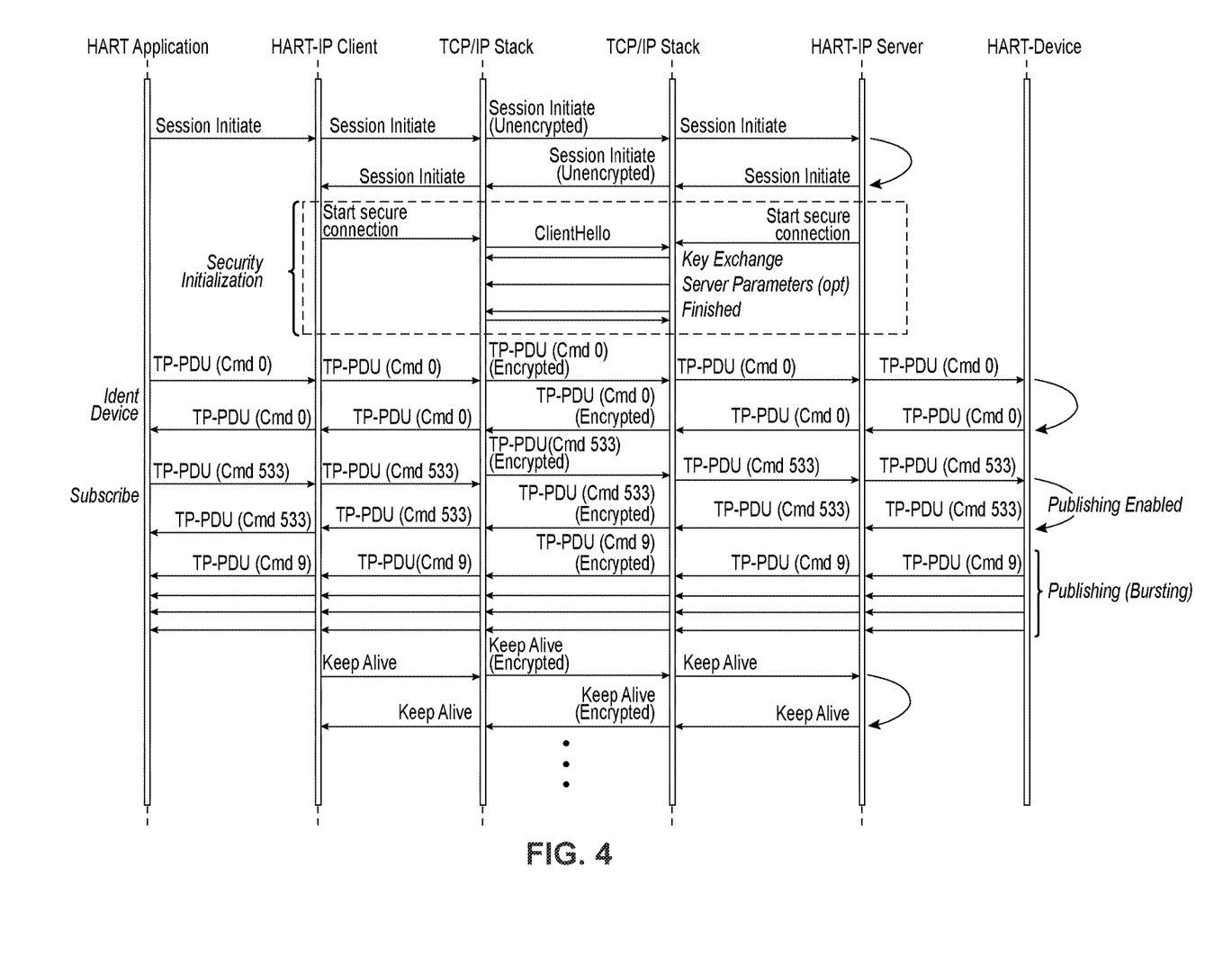
FIG. 4 depicts a timing diagram showing an overview of HART-IP client/server session start-up.

Session Initiate is followed by the establishment of secure communications as described above which may include identifying the version number of the devices to establish which security provisions to use. As an example, the devices on the network connect in an insecure or least secure mode, read the protocol version, and then agree to use the version number of one of the devices (e.g., the lowest or oldest version) to determine which set of security procedures to use, e.g., whether to run in a secure or an insecure mode of operation. The system or method then performs a start TLS after the secure mode has been determined. Moreover, the system may use the version number and optional features of the device to enable additional features such as safety features. The system may also use the initial handshake to retrieve capabilities of the device before completing the connection to the device. Still further, if desired, the system may keep the device (e.g., the server device) in a 'quarantine' state until the device secure/insecure connection sequence has been completed. Moreover, the system may not allow any additional communications to the server device until the secure/insecure mode of operation has been established. Moreover, if desired, the system may also authenticate the identity of the device (e.g., the server device) before it is removed from quarantined state.

Once the security provisions or Version number to use is established, security initialization includes: The HART-IP Client and Server directing the TCP/IP Stack to start TLS/DTLS. The Client TCP/IP stack issues a ClientHello that initiates the TLS/DTLS handshake. The handshake consists of the Key Exchange, (optional) Server Parameters, and Finished indication. The Server's Finished indication can be included with the ServerHello response allowing very rapid connection establishment. Upon confirming TLS/DTLS is operational session initiation is complete. Any combination of legal transactions may occur including: The client transmitting HART Token-Passing PDU (Message ID=3) Request followed by a server Response; The client transmitting Keep Alive (Message ID=2) Request followed by a server Response; The server transmitting a Publish with an embedded Token-Passing PDU (Message ID=3); Any combination of Message ID shown in Table 6 can be utilized. Depending on the client application, the session may remain open indefinitely or be closed by the client.

The normal close transaction consists of the client sending a Session Close (Message Id=1) request, and The server sending the Session Close response The first transactions using the Token-Passing PDU are usually a series of short-frame Command 0 polls to identify the virtual HART field device. This sequence is like a normal host application communication startup. Once Device Identification is complete, HART-IP Clients may subscribe and start receiving runtime data published by the field device.

When opening a session via TCP, the Session Initiate response shall be from the same server port as receiving the request. However, for UDP sessions, it is advantageous for the server to move the session to an unused ephemeral port. The server signals this requirement to the client by responding to the Session Initiate using the port selected by the server. Clients initiating an UDP session must send all subsequent session communications via the port receiving the Session Initiate response from the server.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

The invention claimed is:

1. A method of performing internet protocol (IP) communications between two devices in a process control system using a particular communication protocol, wherein a first one of the devices supports, as a maximum supported communication protocol version, a first version of the particular communication protocol, and wherein a second one of the devices supports, as a maximum supported communication protocol version, a second and different version of the particular communication protocol, wherein the first maximum supported communication protocol version uses a first communication security feature and the second maximum supported communication protocol version uses a second and different communication security feature, the method comprising:
   initiating, via one or more computer processors of the first device and the second device in the process control system, an IP communication session between the first device and the second device, including sending an IP communication session request between the first device and the second device using a security feature supported by a version of the particular communication protocol other than the highest version of the communication protocol supported by the first device and the second device, and including transmitting an indication of a maximum supported communication protocol version associated with one of the first or second devices between the first device and the second device;
   determining, via the one or more computer processors, a communication security feature to be used for IP communications in the communication session between the first device and the second device based on the indication of the maximum supported communication protocol version sent between the first device and the second device including establishing the highest version of the communication protocol supported by both the first device and the second device, and selecting the communication security feature as the communication security feature associated with the determined highest version of the communication protocol supported by both the first device and the second device; and
   implementing, via the one or more computer processors, an IP communication session between the first device and the second device using the determined communication security feature.

2. The method of performing communications of claim 1, wherein the first and second devices support different communication protocol versions and wherein determining the communication security feature includes using a security feature associated with the lower one of the different communication protocol versions.

3. The method of performing communications of claim 1, wherein the determined communication security feature comprises using unsecured communications in the IP communication session.

4. The method of performing communications of claim 1, wherein the determined communication security feature comprises using encryption in the IP communication session.

5. The method of performing communications of claim 1, wherein initiating an IP communication session includes sending, from the first device to the second device, an initiation request that includes the highest version of the communication protocol supported by the first device.

6. The method of performing communications of claim 5, wherein initiating the IP communication session further includes sending from the second device to the first device an indication that the second device supports the highest version of the communication protocol supported by the first device and wherein determining a communication security feature to be used for the IP communication session includes determining a security feature associated with the highest version of the communication protocol supported by the first device.

7. The method of performing communications of claim 5, wherein initiating an IP communication session between the first device and the second device includes sending from the second device to the first device an indication that the second device supports a lower version of the communication protocol than the highest version of the communication protocol supported by the first device and wherein determining a communication security feature to be used for the IP communication session includes determining a security feature associated with the lower version of the communication protocol supported by the second device.

8. The method of performing communications of claim 1, wherein initiating the IP communication session using a communication security feature supported by the version of the communication protocol other than the highest version of the communication protocol supported by the first device includes using unsecured communications.

9. The method of performing communications of claim 1, further including initiating an IP communication session between the first device and the second device by transmitting an indication of a communication protocol version associated with one of the first device or the second device between the first device and the second device in an unsecured mode, and wherein determining a communication security feature to be used for IP communications in the IP communication session between the first device and the second device based on the indication of the communication protocol version sent between the first device and the second device includes reading the communication protocol version sent between the first device and the second device, and using the communication protocol version number to determine whether to run in a secured mode of operation or an unsecured mode of operation.

10. The method of performing communications of claim 9, wherein implementing an IP communication session between the first device and the second device using the determined communication security feature includes performing a start TLS in the determined secured mode of operation or unsecured mode of operation.

11. The method of performing communications of claim 1, further including determining one or more optional features of one of the first device or the second device and enabling or disabling one of the determined one or more optional features of the first device or the second device based on the version of the communication protocol associated with the determined communication security feature.

12. The method of performing communications of claim 1, further including using an initial handshake between the first device and the second device to retrieve one or more capabilities of the second device before completing the communication connection to the second device using the determined communication security feature.

13. The method of performing communications of claim 1, further including placing the second device in a quarantine state until communications using the determined communication security feature have been established.

14. The method of performing communications of claim 13, including authenticating the identity of the second device before removing the second device from the quarantine state.

15. The method of performing communications of claim 1, further including not allowing any additional communications to the second device until communications using the determined communication security feature have been established.

16. A method of performing internet protocol (IP) communications between two devices in a process control system, comprising:
   initiating, via one or more computer processors of a first device and a second device in the process control system, an IP communication session between the first device and the second device, including transmitting an indication of a communication protocol version associated with one of the first or second devices between the first device and the second device;
   determining, via the one or more computer processors, a communication security feature to be used for IP communications in the communication session between the first device and the second device based on the indication of the communication protocol version sent between the first device and the second device; and
   implementing, via the one or more computer processors, an IP communication session between the first device and the second device using the determined communication security feature,
   wherein initiating an IP communication session includes sending, from the first device to the second device, an initiation request that includes the highest version of the communication protocol supported by the first device; and
   further including ignoring a session initiation request from the first device at the second device if the highest version of the communication protocol supported by the second device is lower than the highest version of the communication protocol supported by the first device as indicated in the session initiation request, and further including, after a time-out period, sending a second initiation request from the first device to the second device with an indication of a version of the communication protocol that is less than the highest version of the communication protocol supported by the first device.

17. A method of performing communications between two devices in a process control system using a communication protocol that includes multiple different communication protocol versions, with two or more of the multiple different communication protocol versions specifying one or more different communication security features, wherein one of the different communication protocol versions specifies a communication security feature that is less secure than a communication security feature specified by another one of the different communication protocols, comprising:
   initiating, via one or more computer processors of a first device and a second device in the process control system, a communication session between the first device and the second device, including sending a communication session request between the first device and the second device using the less secure security feature of the one of the different communication protocols and including transmitting an indication of a communication protocol version associated with one of the first device or the second device between the first device and the second device;
   determining, via the one or more computer processors, a particular communication protocol version to be used for performing communications in the communication session between the first device and the second device based on the indication of the communication protocol version sent between the first device and the second device by selecting the most secure version of the communication protocol supported by both the first device and the second device as the determined communication protocol version; and
   implementing, via the one or more computer processors, a communication session between the first device and the second device using the one or more security features of the determined communication protocol version.

18. The method of performing communications of claim 17, wherein the first device and the second device support different communication protocol versions and wherein determining the communication protocol version includes selecting the most secure communication protocol version that is supported by both the first and the second device.

19. The method of performing communications of claim 17, wherein the one or more security features of the determined communication protocol version comprises using unsecured communications.

20. The method of performing communications of claim 17, wherein the first device and the second device support different communication protocol versions as the maximum supported communication protocol version, and wherein determining the communication protocol version includes selecting the lower one of the communication protocol versions between the maximum communication protocol version supported by the first device and the maximum communication protocol supported by the second device.

21. The method of performing communications of claim 17, wherein the first device and the second device support different communication protocol versions as a maximum supported communication protocol version, wherein one of the different maximum supported communication protocols versions uses a security feature that is less secure than the other one of the maximum supported communication protocols, and wherein determining the communication protocol version to be used for performing communications in the communication session includes selecting between the maximum communication protocol version supported by the first device and the maximum communication protocol version supported by the second device, the communication protocol version that uses the security feature that is less secure.

22. The method of performing communications of claim 17, wherein initiating the communication session includes sending, from the first device to the second device, an initiation request that includes an indication of the most secure version of the communication protocol supported by the first device.

23. The method of performing communications of claim 22, wherein initiating the communication session further includes sending from the second device to the first device an indication that the second device supports the version of the communication protocol supported by the first device and wherein determining the particular communication protocol version to be used for performing communications in the communication session includes selecting the communication protocol version sent by the first device.

24. The method of performing communications of claim 22, wherein initiating the communication session between the first device and the second device includes sending from the second device to the first device an indication that the second device supports a different version of the communication protocol than the first device and wherein determining a communication protocol version includes selecting one of the communication protocol versions supported by either the first device or the second device.

25. The method of performing communications of claim 17, wherein implementing a communication session between the first device and the second device using the one or more security features of the determined communication protocol version includes performing a start TLS using the one or more security features of the determined communication protocol version.

26. The method of performing communications of claim 17, further including determining one or more optional features of one of the first device or the second device and enabling or disabling one of the determined one or more optional features of the first device or the second device based on the determined communication protocol version.

27. The method of performing communications of claim 17, further including using an initial handshake between the first device and the second device to retrieve one or more capabilities of the second device before implementing a communication session between the first device and the second device using the one or more security features of the determined communication protocol version.

28. The method of performing communications of claim 17, further including placing the second device in a quarantine state until after implementing a communication session between the first device and the second device using the one or more security features of the determined communication protocol version.

29. The method of performing communications of claim 28, including authenticating the identity of the second device before removing the second device from the quarantine state.

30. The method of performing communications of claim 17, further including not allowing any additional communications to the second device until after establishing a communication session between the first device and the second device using the one or more security features of the determined communication protocol version.

31. A method of performing communications, between two devices in a process control system using a communication protocol that includes multiple different communication protocol versions, with two or more of the multiple different communication protocol versions specifying one or more different communication security features, comprising:

initiating, via one or more computer processors of a first device and a second device in the process control system, a communication session between the first device and the second device, including transmitting an indication of a communication protocol version associated with one of the first device or the second device between the first device and the second device; determining, via the one or more computer processors, a particular communication protocol version to be used for performing communications in the communication session between the first device and the second device based on the indication of the communication protocol version sent between the first device and the second device; and implementing, via the one or more computer processors, a communication session between the first device and the second device using the one or more security features of the determined communication protocol version, wherein transmitting an indication of a communication protocol version associated with one of the first device or the second device between the first device and the second device includes transmitting an indication of the highest communication protocol version supported by the first device as part of a session initiation request, and further including ignoring the session initiation request from the first device at the second device if the highest version of the communication protocol supported by the second device is lower than the highest version of the communication protocol supported by the first device and further including, after a time-out period, sending a second initiation request from the first device to the second device with an indication of a version of the communication protocol that is less than the highest version of the communication protocol supported by the first device.

\* \* \* \* \*